J. GIBBS.
WAGON BRAKE.
APPLICATION FILED MAR. 19, 1912.
1,081,109.
Patented Dec. 9, 1913.
2 SHEETS—SHEET 1.
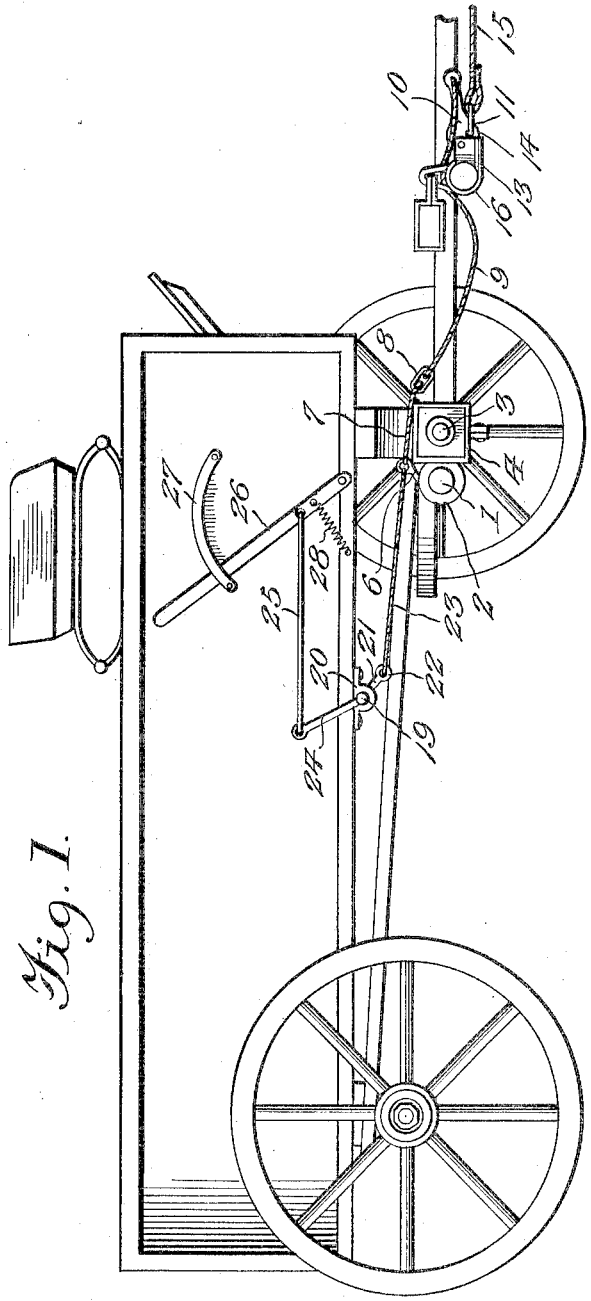
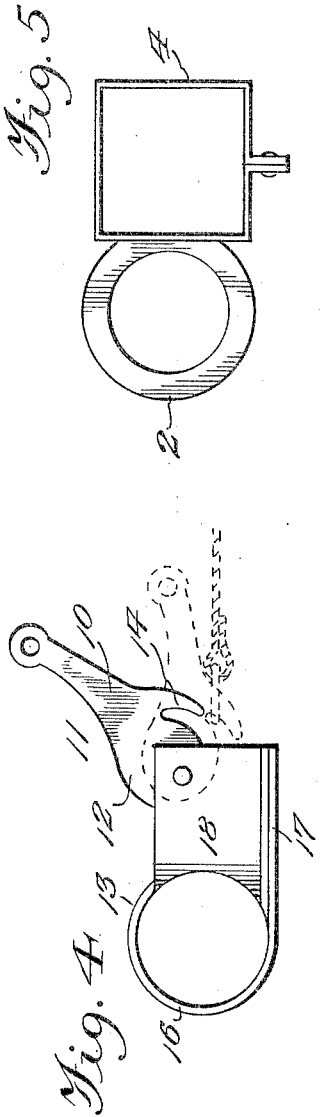
Witnesses
Alfred L. Seiler
E. G. McKee
Inventor
Joshua Gibbs
By
Attorney

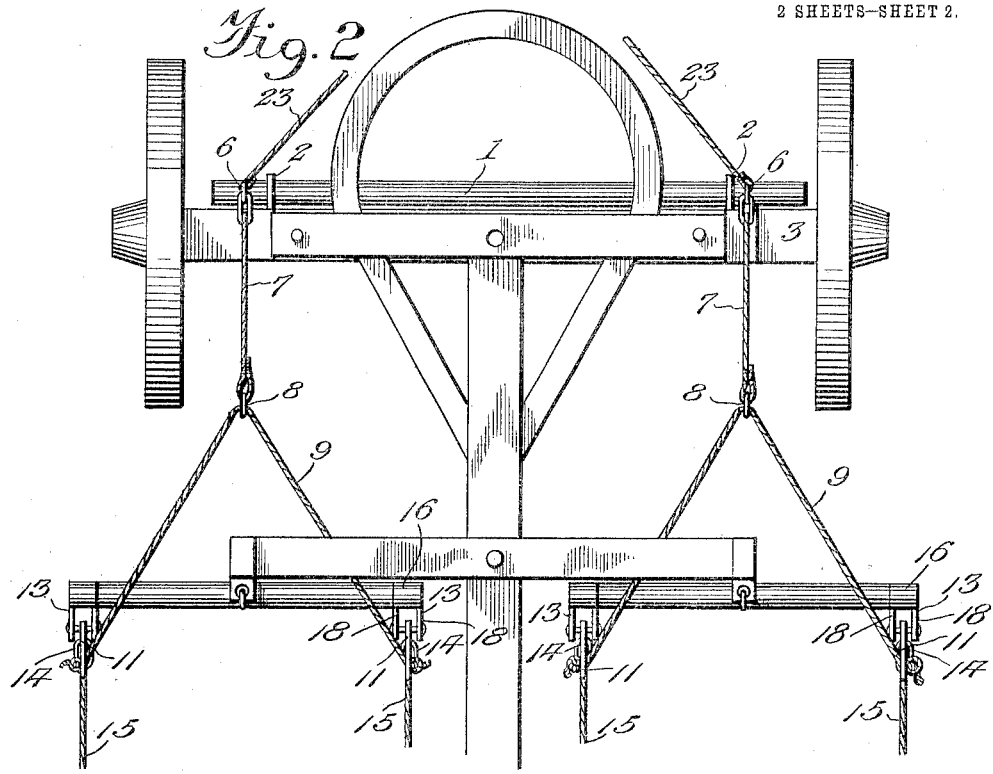
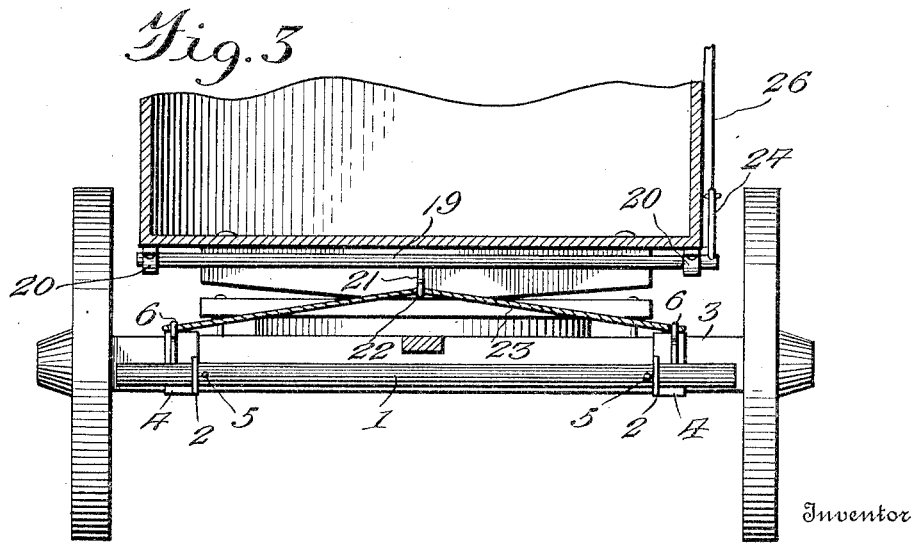

UNITED STATES PATENT OFFICE.

JOSHUA GIBBS, OF FURRH, TEXAS.

WAGON-BRAKE.

1,081,109. Specification of Letters Patent. Patented Dec. 9, 1913.

Application filed March 19, 1912. Serial No. 634,667.

*To all whom it may concern:*

Be it known that I, JOSHUA GIBBS, a citizen of the United States, and a resident of Furrh, in the county of Panola and State of Texas, have invented certain new and useful Improvements in Wagon-Brakes, of which the following is a specification, reference being had to the accompanying drawings.

This invention relates to improvements in horse detaching devices for vehicles.

One object of the invention is to provide a device of this character having means whereby the same may be readily and quickly operated by the driver to release the draft animals.

Another object is to provide a horse detaching device which will be simple, strong, durable and inexpensive in construction, efficient and reliable in operation, and which may be readily applied to any style of vehicle.

With these and other objects in view, the invention consists of certain novel features of construction, combination and arrangement of parts as will be more fully described and claimed.

In the accompanying drawings: Figure 1 is a side view of a wagon with the near front wheel removed, showing my invention applied thereto. Fig. 2 is a plan view of the front end of the running gear of the wagon and the draft devices showing the releasing mechanism of the detaching device applied to the latter. Fig. 3 is a vertical cross section through the wagon body looking toward the front axle. Fig. 4 is a detail side view of one of the trace connecting and releasing hooks and the means for connecting the same to the swingletree. Fig. 5 is a similar view of one of the bearings for the rock shaft of the device.

My improved horse detacher comprises a rock shaft 1, which is mounted to turn in bearing brackets or rings 2, secured to a suitable part of the vehicle and which are here shown as projecting rearwardly from the front axle 3, to which they are secured by rectangular clips 4. The shaft 1 is held against slipping longitudinally in the brackets 2 by stop pins 5. Secured to the shaft near its ends are crank arms 6, to which are connected short forwardly extended connecting cables 7, having secured to their forward ends eyes or loops 8. Slidably engaged between their ends with the eyes or loops 8 are releasing cables 9, the forward ends of which are connected to the stems or levers 10, of the trace connecting and releasing members 11. The members 11 comprise heads 12, which are pivotally mounted in supporting brackets 13, secured to the ends of the swingletrees, said heads 12 having formed thereon eccentrically disposed hooks 14, with which when the hooks are in the position shown in Fig. 1 and in the dotted line position shown in Fig. 4, may be engaged the eyes or rings 14 of the traces 15.

The brackets 13 comprise bands 16, which fit around the ends of the swingletrees and have their lower ends cut out and extended to form the base portion 17, of brackets and having on their upper ends vertically disposed parallel bearing plates 18, which are secured to the base portion 17 as shown. When the eyes or rings 14 of the traces are thus engaged with the connecting members 11 the pull on the traces will hold the hooks of the members in position to securely fasten the traces.

In order to disengage the hooks 14 from the eyes or rings in the traces to release the latter, I provide an operating mechanism comprising a crank shaft 19, which if desired may be part of the braking mechanism of the vehicle, whereby the brakes of the vehicle may be applied simultaneously with the releasing of the draft animals. The shaft 19 is here shown as being mounted to turn in brackets 20, secured to the under side of the wagon body. Fixed on the shaft 19 midway between the ends is a crank arm 21, having in its end an eye 22, with which is engaged an operating cable 23, the ends of which are connected to the crank arms 6 on the rock shaft 1.

On one end of the crank shaft 19 is secured a crank arm 24, which is connected by a rod 25, to hand lever 26, pivoted to one side of the wagon body within convenient reach from the driver's seat, as shown. The upper end of the lever is confined by a guide bar 27, and the lever is held in an operative position by a coiled spring 28.

By constructing and arranging my improved releasing mechanism as herein shown and described it will be seen that it is simply necessary for the driver to push the lever 26 forwardly, which operation will turn the crank shaft 19 and said shaft through its connection with the shaft 1, will rock the latter thereby causing the crank arms thereon to pull back on the cables 7 and 9 which will swing the trace connecting and releasing members 11 upwardly, thus disengaging the hooks 14 from the eyes or rings in the traces and releasing the latter and the draft animals, thereby relieving the occupants of the vehicle from all danger incident to the running away of the draft animals and also saving the wagon or other vehicle from possible demolition.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

A horse detaching mechanism for vehicles, comprising shaft supporting brackets adapted to be secured to the front axle of the vehicle, a rock shaft mounted in said brackets, crank arms fixed on said shaft, brackets secured to the swingletrees of the vehicle, trace connecting and releasing members, comprising heads pivoted in said brackets, operating levers formed on said heads, eccentrically arranged trace fastening hooks also formed on said heads, flexible connections between said levers and the crank arms on said rock shaft, whereby when the shaft is rocked said trace releasing members will be actuated to release the traces and means to rock said shaft.

In testimony whereof I affix my signature, in presence of two witnesses.

JOSHUA GIBBS.

Witnesses:
 J. T. JOHNSON,
 NELSON CLARK.

---

Copies of this patent may be obtained for five cents each, by addressing the "Commissioner of Patents, Washington, D. C."